United States Patent
Ederer et al.

(10) Patent No.: US 11,097,469 B2
(45) Date of Patent: Aug. 24, 2021

(54) METHOD AND DEVICE FOR PRODUCING THREE-DIMENSIONAL MODELS WITH A TEMPERATURE-CONTROLLABLE PRINT HEAD

(71) Applicant: VOXELJET AG, Friedberg (DE)

(72) Inventors: Ingo Ederer, Geltendorf (DE); Daniel Gunther, Munich (DE)

(73) Assignee: VOXELJET AG, Friedberg (DE)

( * ) Notice: Subject to any disclaimer, the term of this patent is extended or adjusted under 35 U.S.C. 154(b) by 762 days.

(21) Appl. No.: 14/435,557

(22) PCT Filed: Oct. 10, 2013

(86) PCT No.: PCT/DE2013/000588
§ 371 (c)(1),
(2) Date: Apr. 14, 2015

(87) PCT Pub. No.: WO2014/059958
PCT Pub. Date: Apr. 24, 2014

(65) Prior Publication Data
US 2015/0266238 A1   Sep. 24, 2015

(30) Foreign Application Priority Data

Oct. 15, 2012  (DE) .................... 20 2012 009 796.2
Mar. 22, 2013  (DE) .................... 10 2013 004 940.7

(51) Int. Cl.
*B29C 67/00*       (2017.01)
*B29C 64/153*      (2017.01)
(Continued)

(52) U.S. Cl.
CPC .......... *B29C 64/153* (2017.08); *B29C 64/165* (2017.08); *B29C 64/364* (2017.08);
(Continued)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS 3,913,503 A   10/1975  Becker
4,247,508 A    1/1981  Housholder
(Continued)

FOREIGN PATENT DOCUMENTS

AU      720255 B2    5/2000
CN    101942659 A    1/2011
(Continued)

OTHER PUBLICATIONS

US 4,937,420 A, 06/1990, Deckard (withdrawn)
(Continued)

*Primary Examiner* — Ryan M Ochylski
(74) *Attorney, Agent, or Firm* — The Dobrusin Law Firm, P.C.

(57) ABSTRACT

The present invention relates to a method for producing three-dimensional models by a layering technique, particulate build material being applied to a build space, and binder material subsequently being selectively applied to the build material with the aid of a printer, the binder material containing a moderating agent and subsequently being sintered with the aid of a heat lamp, the print head being protected against overheating by active and/or passive cooling.

21 Claims, 10 Drawing Sheets

(51) Int. Cl.
  *B29C 64/165* (2017.01)
  *B29C 64/364* (2017.01)
  *B29C 64/386* (2017.01)
  *B33Y 10/00* (2015.01)
  *B33Y 30/00* (2015.01)
  *B33Y 50/02* (2015.01)
  *B29K 77/00* (2006.01)
  *B29K 105/00* (2006.01)

(52) U.S. Cl.
  CPC ........ *B29C 64/386* (2017.08); *B29K 2077/00* (2013.01); *B29K 2105/0005* (2013.01); *B29K 2105/251* (2013.01); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A * | 4/1993 | Sachs ............... B05C 19/04 419/2 |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,459,498 A * | 10/1995 | Seccombe ............ B41J 2/04528 347/18 |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |

(56) References Cited

U.S. PATENT DOCUMENTS

| | | |
|---|---|---|
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höchsmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0000163 A1 | 2/2002 | Shen |
| 2002/0015783 A1 | 2/2002 | Harvey |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0006963 A1 | 4/2003 | Barlow et al. |
| 2003/0065400 A1 | 4/2003 | Beam et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2003/0156147 A1 | 8/2003 | Misumi |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0009405 A1 | 5/2004 | Kasperchik et al. |
| 2004/0084814 A1 | 5/2004 | Boyd et al. |
| 2004/0104515 A1* | 6/2004 | Swanson ............... B29C 41/36 264/497 |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0002325 A1 | 11/2004 | Monsheimer et al. |
| 2004/0232583 A1* | 11/2004 | Monsheimer ....... B29C 67/0077 264/113 |
| 2004/0239009 A1 | 12/2004 | Collins et al. |
| 2005/0000173 A1 | 1/2005 | Harrysson |
| 2005/0003189 A1 | 1/2005 | Bredt et al. |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Ederer et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1 | 12/2005 | Russell et al. |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0176346 A1 | 8/2006 | Ederer et al. |
| 2006/0208388 A1 | 9/2006 | Bredet et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |

(56) References Cited

U.S. PATENT DOCUMENTS

| | | |
|---|---|---|
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0212584 A1 | 8/2010 | Ederer et al. |
| 2010/0002443 A1 | 9/2010 | Ederer et al. |
| 2010/0207288 A1 | 9/2010 | Enrico |
| 2010/0243123 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0232855 A1* | 9/2011 | Crump ............ B22F 3/1055 164/253 |
| 2011/0308755 A1 | 12/2011 | Hochsmann |
| 2012/0046779 A1 | 2/2012 | Pax et al. |
| 2012/0009725 A1 | 4/2012 | Hartmann |
| 2012/0094026 A1 | 4/2012 | Ederer et al. |
| 2012/0012645 A1 | 5/2012 | Abe et al. |
| 2012/0113439 A1 | 5/2012 | Ederer |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0215203 A1* | 8/2013 | Chen ............... B41J 11/002 347/102 |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0002023 A1 | 7/2014 | Ederer et al. |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0026623 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0000015 A1 | 1/2016 | Hartmann et al. |
| 2016/0052165 A1 | 2/2016 | Hartmann |
| 2016/0052166 A1 | 2/2016 | Hartmann |
| 2016/0318251 A1 | 3/2016 | Ederer et al. |
| 2016/0001073 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0079133 A1 | 3/2018 | Ederer et al. |
| 2018/0141271 A1 | 5/2018 | Gunter et al. |
| 2018/0326662 A1 | 11/2018 | Gunther et al. |
| 2018/0369910 A1 | 12/2018 | Gunter et al. |
| 2019/0047218 A1 | 2/2019 | Ederer et al. |
| 2019/0084229 A1 | 3/2019 | Gunther |
| 2020/0055246 A1 | 2/2020 | Gunther et al. |

FOREIGN PATENT DOCUMENTS

| | | | |
|---|---|---|---|
| DE | 3221357 A1 | 12/1983 | |
| DE | 3930750 C2 | 3/1991 | |
| DE | 4102260 A1 | 7/1992 | |
| DE | 4305201 C1 | 4/1994 | |
| DE | 4 325 573 | 2/1995 | |
| DE | 29506204 U1 | 6/1995 | |
| DE | 4440397 | 9/1995 | |
| DE | 19525307 A1 | 1/1997 | |
| DE | 19530295 C1 | 1/1997 | |
| DE | 19528215 A1 | 2/1997 | |
| DE | 29701279 U1 | 5/1997 | |
| DE | 19545167 A1 | 6/1997 | |
| DE | 69031808 T2 | 4/1998 | |
| DE | 19853834 | 5/2000 | |
| DE | 10216013 B1 | 10/2003 | |
| DE | 69634921 T2 | 12/2005 | |
| DE | 201 22 639 U1 | 11/2006 | |
| DE | 10 2006 040 305 A1 | 3/2007 | |
| DE | 102006003765 A1 | 7/2007 | |
| DE | 102006029298 A1 | 12/2007 | |
| DE | 102007040755 A1 | 3/2009 | |
| DE | 102007047326 A1 | 4/2009 | |
| DE | 102011053205 A1 | 3/2013 | |
| DE | 102015006363 A1 | 12/2016 | |
| DE | 102015008860 A1 | 1/2017 | |
| DE | 102015011503 A1 | 3/2017 | |
| DE | 102015011790 A1 | 3/2017 | |
| EP | 361847 B1 | 4/1990 | |
| EP | 0538244 B1 | 4/1993 | |
| EP | 0431924 B1 | 1/1996 | |
| EP | 0870622 A1 | 10/1998 | |
| EP | 1457590 A | 9/2004 | |
| EP | 1648686 B1 | 4/2006 | |
| EP | 1740367 B1 | 1/2007 | |
| EP | 1381504 B1 | 8/2007 | |
| GB | 2297516 A | 8/1996 | |
| JP | S62275734 A | 11/1987 | |
| JP | 2003136605 A | 5/2003 | |
| JP | 2004082206 A | 3/2004 | |
| JP | 2009202451 A | 9/2009 | |
| WO | 01/40866 A2 | 6/2001 | |
| WO | 2001/078969 A2 | 10/2001 | |
| WO | 2004/014637 A1 | 2/2004 | |
| WO | 2005/105412 A1 | 11/2005 | |
| WO | 2006/100166 A1 | 9/2006 | |
| WO | 2007/114895 A2 | 10/2007 | |
| WO | WO 2007114895 A2 * | 10/2007 | ......... B29C 67/0066 |
| WO | 2008/049384 A1 | 5/2008 | |
| WO | 2008061520 A2 | 5/2008 | |
| WO | 2011063786 A1 | 6/2011 | |
| WO | 2013075696 A1 | 5/2013 | |
| WO | 2014090207 A1 | 6/2014 | |
| WO | 2014166469 A1 | 10/2014 | |
| WO | 2015078430 A1 | 6/2015 | |
| WO | 2015081926 A1 | 6/2015 | |
| WO | 2015085983 A2 | 6/2015 | |
| WO | 2015090265 A1 | 6/2015 | |
| WO | 2015090567 A1 | 6/2015 | |
| WO | 2015096826 A1 | 7/2015 | |
| WO | 2015149742 A1 | 10/2015 | |
| WO | 2015180703 A1 | 12/2015 | |
| WO | 2016019937 A1 | 2/2016 | |
| WO | 2016019942 A1 | 2/2016 | |
| WO | 2016058577 A1 | 4/2016 | |

(56) References Cited

FOREIGN PATENT DOCUMENTS

| WO | 2016095888 A1 | 6/2016 |
| WO | 2016101942 A1 | 6/2016 |
| WO | 2016146095 A1 | 9/2016 |

OTHER PUBLICATIONS

International Search Report, Application No. PCT/DE2013/000588, dated Mar. 7, 2014.

International Preliminary Report on Patentability and Written Opinion, Application No. PCT/DE2013/000588, dated Apr. 21, 2015.

Marcus et al., Solid Freedom Fabrication Proceedings, Nov. 1993.

Cima et al., "Computer-derived Microstructures by 3D Printing: Bio- and Structural Materials," SFF Symposium, Austin, TX, 1994.

Marcus, et al., Solid Freeform Fabrication Proceedings, Sep. 1995, p. 130-133.

Gebhart, Rapid Prototyping, pp. 118-119, 1996.

Feature Article—Rapid Tooling—Cast Resin and Sprayed Metal Tooling by Joel Segal, Apr. 2000.

EOS Operating Manual for Laser Sintering Machine with Brief Summary Feb. 22, 2005.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Sachs et al., "Three-Dimensional Printing: Rapid Tooling and Prototypes Directly from a CAD Model", Massachusetts Institute of Technology, pp. 143-151, Jan. 1990.

Williams, "Feasibility Study of Investment Casting Pattern Design by Means of Three Dimensional Printing", Department of Mechanical Engineering, abstract only; Sep. 25, 2001.

Armin Scharf, "Erster 3D—Endlosdrucker", zwomp.de, http://www.zwomp.de/2012/11/06/voxeljet-endlosdrucker/ dated Nov. 6, 2012.

Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.

Screen shots of URL: http://www.youtube.com/watch?v=hgIrNXZjIxU taken in approximately 5 second intervals on Nov. 12, 2015.

Translation of Chinese Second Office Action, CN Application No. 2013/80053982.4 dated Oct. 27, 2016.

\* cited by examiner

METHOD AND DEVICE FOR PRODUCING THREE-DIMENSIONAL MODELS WITH A TEMPERATURE-CONTROLLABLE PRINT HEAD

CLAIM OF PRIORITY

This application is a national phase filing under 35 USC § 371 from PCT Application serial number PCT/DE2013/000588 filed on Oct. 10, 2013, and claims priority therefrom. This application further claims priority from German Patent Applications DE 20 2012 009 796.2 filed on Oct. 15, 2012 and DE 10 2013 004 9407 filed on Mar. 22, 2013. PCT/DE2013/000588, DE 20 2012 009 796.2 and DE 10 2013 004 940.7 are each incorporated herein in their entireties by reference.

FIELD OF THE INVENTION

The invention relates to a method and a device for producing three-dimensional models according to the definition of the species in Patent Claim 1.

BACKGROUND OF THE INVENTION

A method for producing three-dimensional objects from computer data is described in the European patent specification EP 0 431 924 131. In this method, a particulate material is deposited in a thin layer onto a platform, and a binder material is selectively printed on the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which the remaining power is removed, for example by brushing.

Other powder-supported rapid prototyping processes work in a similar manner, for example selective laser sintering or electron beam sintering, in which a loose particulate material is also deposited in layers and selectively solidified with the aid of a controlled physical radiation source.

All these methods are referred to collectively below as "three-dimensional printing methods" or 3D printing methods.

Of all the layering techniques, 3D printing based on powdered materials and the supply of liquid binder is the fastest method.

Different particulate materials, including polymer materials, may be processed using these methods. However, the disadvantage here is that the particulate material feedstock may not exceed a certain powder density, which is usually 60% of the density of the solid.

Nevertheless, the strength of the desired components depends to a significant extent on the density reached. For a high strength of the components, it would therefore be necessary to add 40% and more of the particulate material volume in the form of the liquid binder. This is a relatively time-consuming process, not only due to the single-drop supply, but also due to many process problems which arise, for example, from the inevitable reduction of the amount of liquid during solidification.

In another embodiment, which is known to those skilled in the art as "high-speed sintering," abbreviated as HSS, the particulate material is solidified by supplying infrared radiation. The particulate material is physically bound using a melting operation. The comparatively poor absorption of thermal radiation in colorless plastics is utilized here. However, this absorption may be increased many times by introducing an IR acceptor, also known as a moderating agent, into the plastic. The IR radiation may be introduced in different ways, e.g., using a rod-shaped IR lamp, which is moved evenly over the build space. The selectivity is achieved by printing the particular layer with an IR acceptor in a targeted manner. The IR radiation is coupled into the particle material in the areas that are printed much more effectively than into the unprinted areas. This results in a selective heating in the layer beyond the melting point and thus to selective solidification. This process is described, for example, in EP1740367B1 and EP1648686B1. In these publications, a simple device is also demonstrated, which, however, is operational only on a small scale and is not suitable for printing larger build spaces, since it lacks a corresponding temperature management system.

The object of the present invention is thus to provide a scalable device, with the aid of which the HSS process is facilitated or which at least improves the disadvantages of the prior art.

The device according to the invention comprises a build plane, onto which the layers of the particulate material are deposited. The build plane is moved layer by layer through a build space, using a linear positioning unit. The build space may be defined, for example, by a job box, which may be removed from the device at the end of the process. The device parts for applying the layers move within a process chamber. The device for applying the layer may be, for example, a vibration coater (DE10216013B4) or a counter-driven roller (EP0538244B1) or a simple scraper, which applies the particulate material to the build space in a thin layer that is 20 μm to 300 μm thick, preferably 50 μm to 200 μm thick.

A print head, which has at least one nozzle end prints the particular layer with an IR acceptor, is also situated in the process chamber.

in principle, it is possible to deposit the IR acceptor in a vector-like manner onto the build space in the form of a jet or in the form of single drops. To achieve a suitable resolution, the jet or drop size should be in a range from 20 to 200 μm. To achieve higher process speeds, it is advantageous to use a print head which generates single drops with the aid of a large number of nozzles and moves over the build plane in a grid-like pattern. An IR lamp, which illuminates the build plane as a whole or parts of the build plane in the form of a spot or a line, is also situated in the process chamber. In the latter two cases, the IR lamp must be moved over the build space with the aid of a positioning unit in order to illuminate the entire build space. A rod-shaped IR lamp has proven to be advantageous, which extends over the entire width of the build space and lights up a relatively narrow area in the positioning direction. The positioning units for moving the coater, the print head and the IR lamp may be designed independently of each other or in combination. The lamp embodied in the shape of a rod is advantageously situated on the back side of the coater unit.

In this manner, the coater may carry out the exposure to light when returning to the starting position, while the movement in the other direction is used for coating, possibly with reduced lamp power. The print head in this embodiment may be mounted on another moving axis farther behind [sic; the] lamp.

The build plane preferably moves in a build cylinder which is open at least on the side of the build plane and forms the build space together therewith. The build space may advantageously be removed from the device at the end of the printing process. The device may then carry out a new layering process by inserting another build space.

The HSS process may be used to process many polymer materials in particulate form, for example polyamide. Graphite, for example, may be used as the IR acceptor, which is mixed in a carrier fluid in the form of a suspension. Various easy-to-print fluids, such as isopropyl alcohol, din/ethyl succinate and, with restrictions, ethyl alcohol or water, are suitable as carrier fluids.

The process must be set in such a way that the temperature in the printed areas is above the melting point of the particulate material, at least for a short period of time. In the case of polyamide 12, or PA 12 for short, this temperature is approximately 180° C. On the other hand, the temperature in the unprinted areas should be as low as possible, since the polymer material may change irreversibly even at lower temperatures.

The quantity of IR energy introduced into the particulate material may be set, for example, by means of the lamp power or by means of the speed at which the rod-shaped lamp moves over the build space. The disadvantage of the method is that the carrier fluid for the IR acceptor evaporates in the printed areas and, during this process, the temperature thereby decreases in the areas. It is therefore advantageous to increase the temperature in the build space to a higher level with the aid of suitable measures in order to minimize the necessary temperature difference that must be overcome with the aid of the lamp. Care should also be taken to avoid selecting too high a temperature in order to minimize damage to the particulate material. In principle, it is also possible to preheat the particulate material prior to coating. However, it has been demonstrated that the particulate material very quickly adapts to the ambient temperature during and after coating and dissipates the thermal energy again. A temperature range of 60° C.-120° C. for PA 12 has been demonstrated to be advantageous for a build space atmosphere. A temperature range of 75° C. to 95° C. is even more advantageous. It is possible that the particulate material would already begin to react with the oxygen in the air at these temperatures. It may therefore be necessary to apply a protective gas to the build space. Nitrogen, for example, is suitable as the protective gas; other gases such as argon may also be used.

To increase the temperature in the build space to the desired level, it may be necessary to provide additional heating means in the device. This may be done, for example, in the form of IR radiators above the build space, which heat the entire build space as evenly as possible. However, it would also be conceivable to remove the air from the process chamber, heat it using corresponding means, such as a heater battery, and blow it back into the process chamber in a targeted manner. Moreover, it is advantageous if the heat in the process chamber is maintained at a preferably constant level. For this purpose, a temperature controller is advantageous, which regulates the heating means in the build space in interaction with a temperature sensor. The temperature gradient on the build space should not exceed 10° C. To simplify the temperature regulation, it is desirable if as little heat as possible is lost to the surroundings. It is therefore necessary to insulate the process chamber using suitable measures and to provide corresponding seals on doors and flaps. The same applies to the build space, which is also designed in such a way that little heat is dissipated to the surroundings. This is done by providing the build cylinder with a double-walled design, including corresponding insulation at the contact points. In principle, it is also possible to compensate for the temperature loss in the build space by means of an active heating, e.g., of the inner walls of the build cylinder and/or the building platform. Another option is to actively introduce preheated gas into the build space, which acts as an energy carrier and transfers the heat to the particulate material feedstock. The gas may be introduced, for example, by means of bores in the building platform.

So-called filament dispensers, which deflect a fluid stream onto the build space via a nozzle, may be used as the print head. The fluid stream contains the IR acceptor, e.g., in the form of solid graphite particles in a solvent suspension. The nozzle should have a diameter of 0.1-0.5 mm for a suitable print resolution. A valve may be inserted upstream from the nozzle, which is able to quickly switch the fluid stream. The nozzle should be moved over the build space at a short distance of only a few mm to ensure the positioning accuracy of the deposition of the fluid stream. The filament dispenser is moved over the build space in a vector-like manner with the aid of at least two linear axes. The kinematics preferably comprise a portal with three linear axes. In principle, other kinematics of motion are also conceivable, for example, an articulated arm robot, which guides the filament dispenser over the build space.

In one preferred embodiment, the IR acceptor is dispensed in fluid form onto the build space using a print head which includes a large number of single-drop generators. Print heads of this type are known from many applications, including 3D printing, where a binder instead of the IR acceptor is dispensed in layers onto a particulate material.

Drop generators of this type work according to different principles, for example the piezo principle or the bubblejet principle. In addition to these so-called drop-on-demand single drop generators, continuous systems are also known, in which a switchable stream of single drops is generated. In principle, all these systems are suitable for the aforementioned task; however, the piezo systems have significant advantages with regard to lifespan, performance and economic feasibility.

Piezoelectric printing systems work with one or multiple open nozzles. The nozzle diameters are usually less than 80 µm. A pressure pulse is briefly applied to the fluid in equally small pump chambers with the aid of a piezoelectric actuator. The fluid is significantly accelerated in the nozzles and emerges therefrom in the form of drops. Due to this functionality, certain limits are imposed on the present device. Thus, the fluid must have a relatively low viscosity. The viscosity should preferably be less than 20 mPas. In addition, the IR acceptor particles mixed into the carrier fluid must be much smaller than the narrowest channel width in the printing system. As a result, the particles are preferably smaller than 5 µm and even more preferably smaller than 1 µm. Due to the operating principle of the printing system using the pressure surge, it is necessary for all channels and the pump chambers to be filled with the fluid without any gas bubbles. To maintain this condition during operation as well, it is necessary either to select a carrier fluid which has an evaporation temperature above the operating temperature or to control the temperature of the fluid in such a way that no phase transition of the fluid takes place. Moreover, the piezoelectric actuators have a limit temperature up to which they usually may be heated without sustaining irreversible damage. This temperature is usually under 120° C.

It is apparent from the above discussion that the printing system must be protected against excessive IR radiation in the process chamber, on the one hand, and the temperature of the printing system must be regulated independently with respect to the process chamber temperature, on the other hand.

The printing system may be protected against the IR radiation by means of corresponding shielding and/or by the distance to the radiation sources. This may be effectively accomplished with radiation sources from above and from the sides. However, it is difficult to protect the print head against radiation from below, since it must move at a very short distance of 1-5 mm, preferably 2-3 mm from the powder bed. This short distance is necessary to ensure a precise positioning of the small fluid droplets on the build space. For this reason, it is necessary to keep the dwell time of the print head over the hot build space as short as possible.

Despite the aforementioned measures, the desired temperature of the printing system, which is 40° C.-60° C., is much lower than the temperature of the process chamber. Corresponding cooling measures must be provided therefor.

These measures are divided into internal cooling, external cooling and partitioning. Only a combination of different measures facilitates a precise regulation. Regulating the temperature is necessary, since the viscosity of the print fluid is greatly dependent on the temperature. The dispensing capacity of the print head, in turn, is linked to the viscosity. Consequently, an imprecise regulation may result in fluctuating supply of the moderating agent. The print head may be cooled at reversing points in the build space by passing the print head over cooled metal plates.

This may result in component distortion. For the purpose of more detailed explanation, the invention is described in greater detail below on the basis of preferred exemplary embodiments with reference to the drawing.

Figure 1:
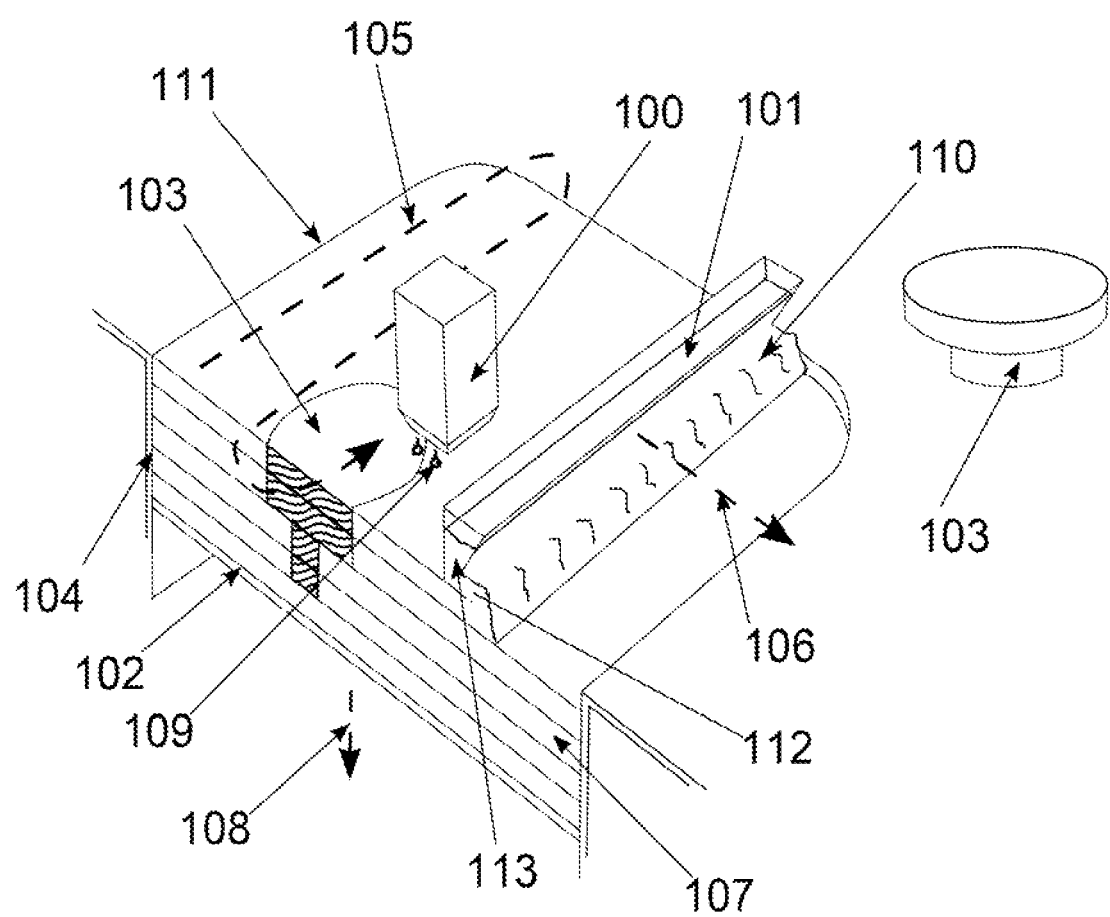
FIG. 1 shows a method known from the prior art.

FIG. 1 shows a known device according to the prior art. It is used to produce bodies such as object 103. Body 103 may have a nearly arbitrary complexity. The device is referred to below as a 3D printer.

The process of constructing a body 103 begins in that movable building platform 102 is moved to its highest position in device 104. At least one layer thickness is also present between building platform 102 and the lower edge of coater 101. The coater is moved to a position in front of build space 111 with the aid of an axis system, which is not illustrated. In this position, coater 101, including its stock 113 of particulate material, is caused to vibrate. The particulate material flows out of gap 112. Outflowing material 110 fills the still empty layer due to a forward movement 106 of coater 101.

Subsequently or even during the movement of coater 101, print head 100 is set in motion by an axis system, which is also not illustrated. The latter follows a meandering path 105, which passes over the build space. According to the sectional diagrams of body 103 to be produced, the print head dispenses drops of binder 109 and solidifies these areas. This basic principle remains the same regardless of print head 100 used. Depending on the size, in extreme cases, meandering path 105 is reduced to a simple forward and backward movement.

After printing, building platform 102 is moved in direction 108. A new layer 107 for coater 101 is generated thereby. The layer cycle begins all over again when coater 101 returns to its starting position. Repeatedly carrying out this cycle produces component [sic; body] 103 in the end. After the building process, component [sic: body] 103 may be removed from the loose powder still surrounding it.

Figure 2:
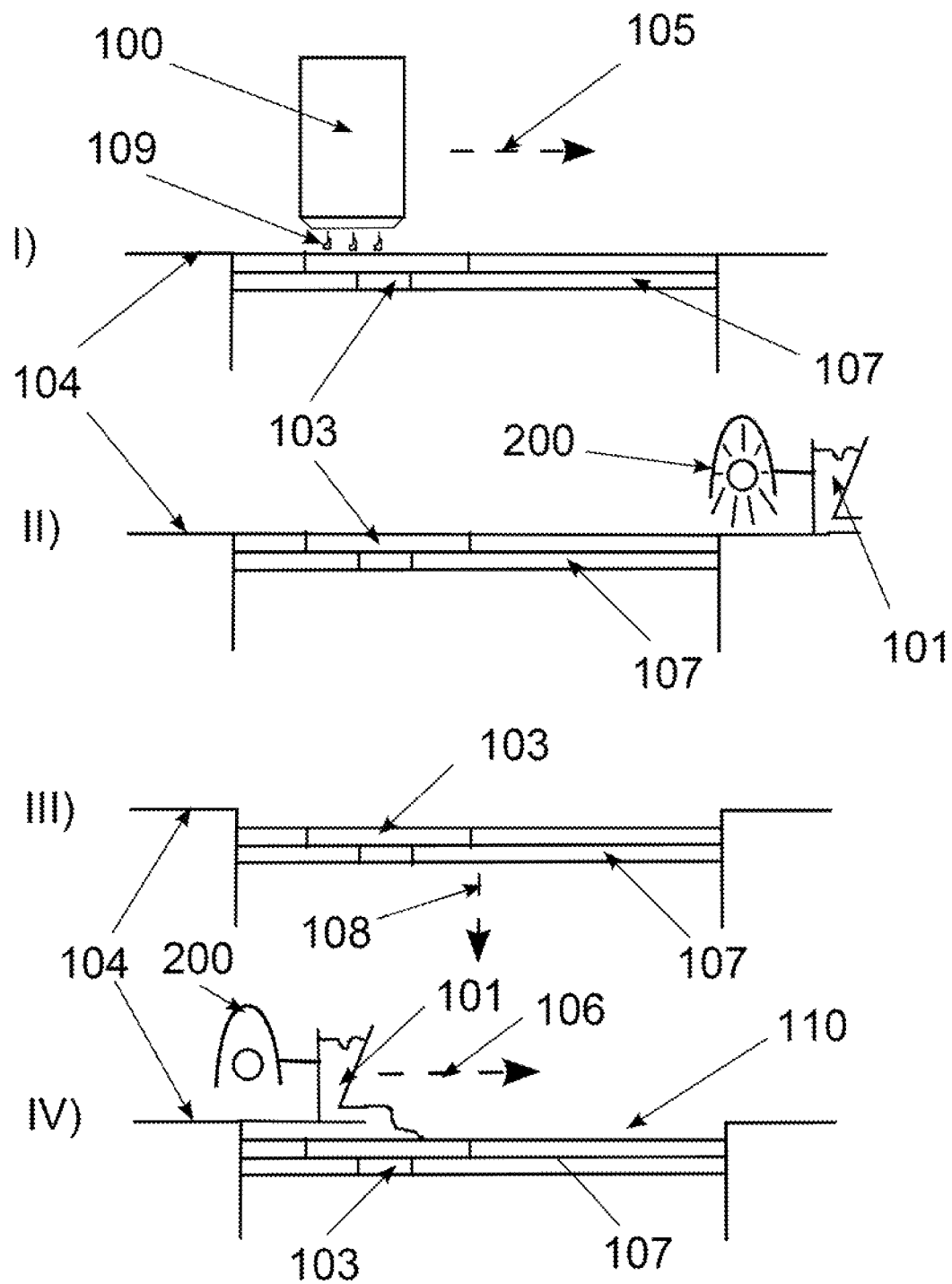
FIG. 2 shows a diagram of the process sequence of a 3D printer which operates according to the HSS principle.

The solidification process described above, in which the particles of the particulate material are sintered, is one variant of this process. FIG. 2 shows the sequence of a method of this type. It is an expansion of the 3D printer described above.

The representation under I shows the printing process, which takes place in a manner similar to the above description. Print head 100 undergoes a meandering movement and deposits drops, including moderating agent 109, in the area of component [sic: body] 103. In terms of many of its parts, device 104 is structured like a 3D printer. The drop generation is preferably based on the piezoelectric principle, since print heads having maximum lifespans may be built hereby. This effect may be used only up to a certain limit temperature TLimit. Above this temperature, the drop generation is disturbed, or the drop generator sustains irreversible damage.

Step II deviates from the above description. A heat lamp, which generates radiation 201 adapted to the moderating agent, is guided over the build space. When it reaches the printed sites, the heat is effectively coupled into the particulate material and causes it to be sintered. The rest of the build space also absorbs not inconsiderable amounts of heat.

Process steps III and IV are again entirely similar to the description of 3D printing. Building platform 102 is first lowered into device 104 in direction 108. Coater 101 then fills layer 110 with new particulate material.

Figure 3:
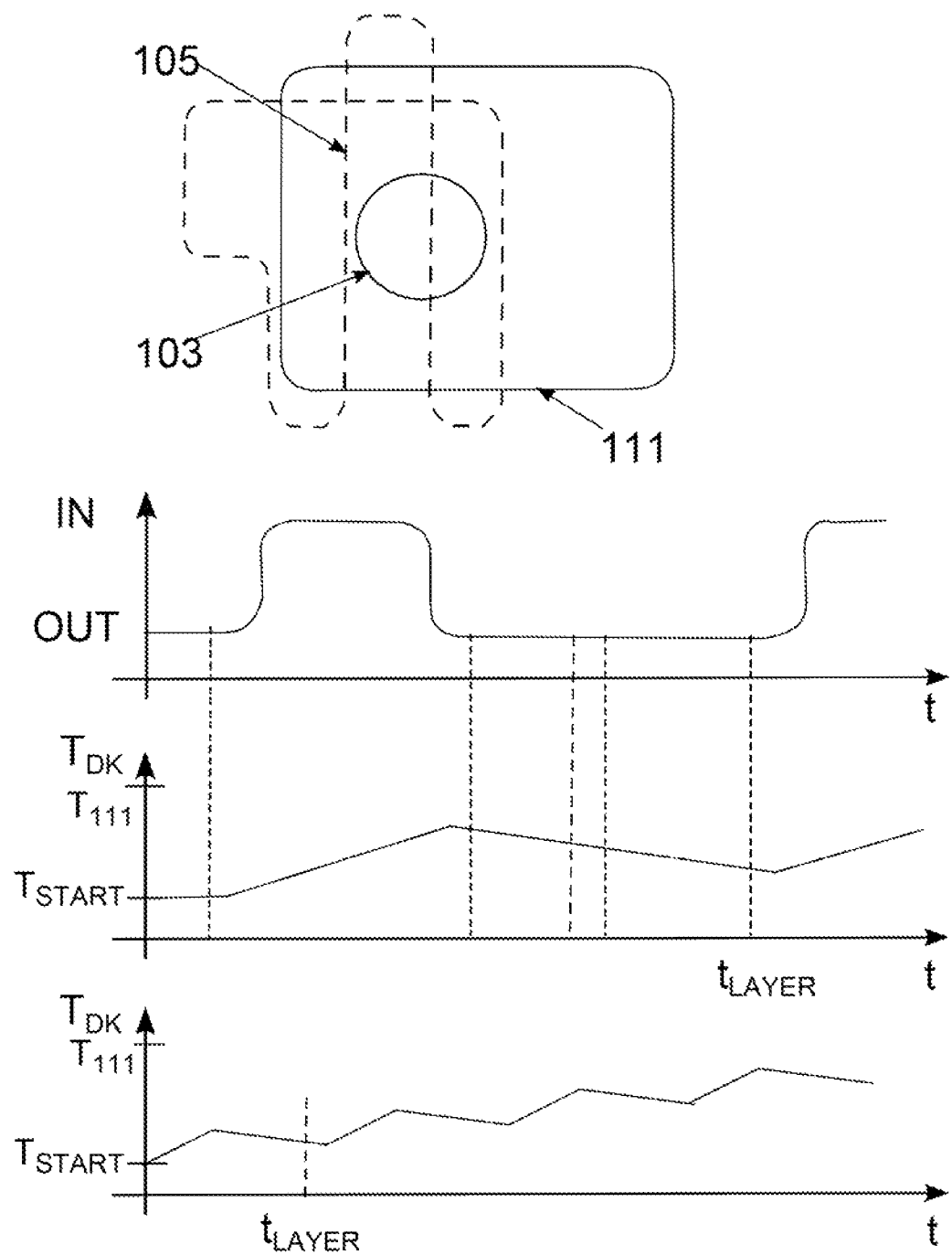
FIG. 3 shows a graphic representation of the dwell times of the print head above the heated build space in a process according to FIG. 2.

FIG. 3 shows a top view of a preferred device according to the invention. Print head 100 is omitted for the purpose of better illustrating meandering print head path 105. It is apparent that the print head executes large sections of its movement over build space 111. Simplified, the build space has a fixed temperature T111. At the beginning of the process, the print head has temperature T100=TBegin. FIG. 3 also shows a schematic representation of the dwell time of print head 100 over build space 111. The diagram shows the process steps from FIG. 2.

Assuming that the build space has temperature T111, the following conditions arise, which are illustrated in the other diagrams in FIG. 3. The print head heats up over the build space. Afterwards, it may again transfer heat to the surroundings in its idle position. Depending on the heat absorption over the build space and the heat dissipation in the idle position, a stationary temperature between start temperature TStart and build space temperature T111 sets in. It is demonstrated that, if a higher printing capacity is desired, the print head must be protected against overheating above TLimit with the aid of active and/or passive cooling. To ensure uniform dispensing capacities, the print head must also be maintained within a very narrow temperature range. Temperatures of 40-60° C. are particularly preferred in this case. According to experience, a control of ±2° C. delivers good print results.

Figure 4:
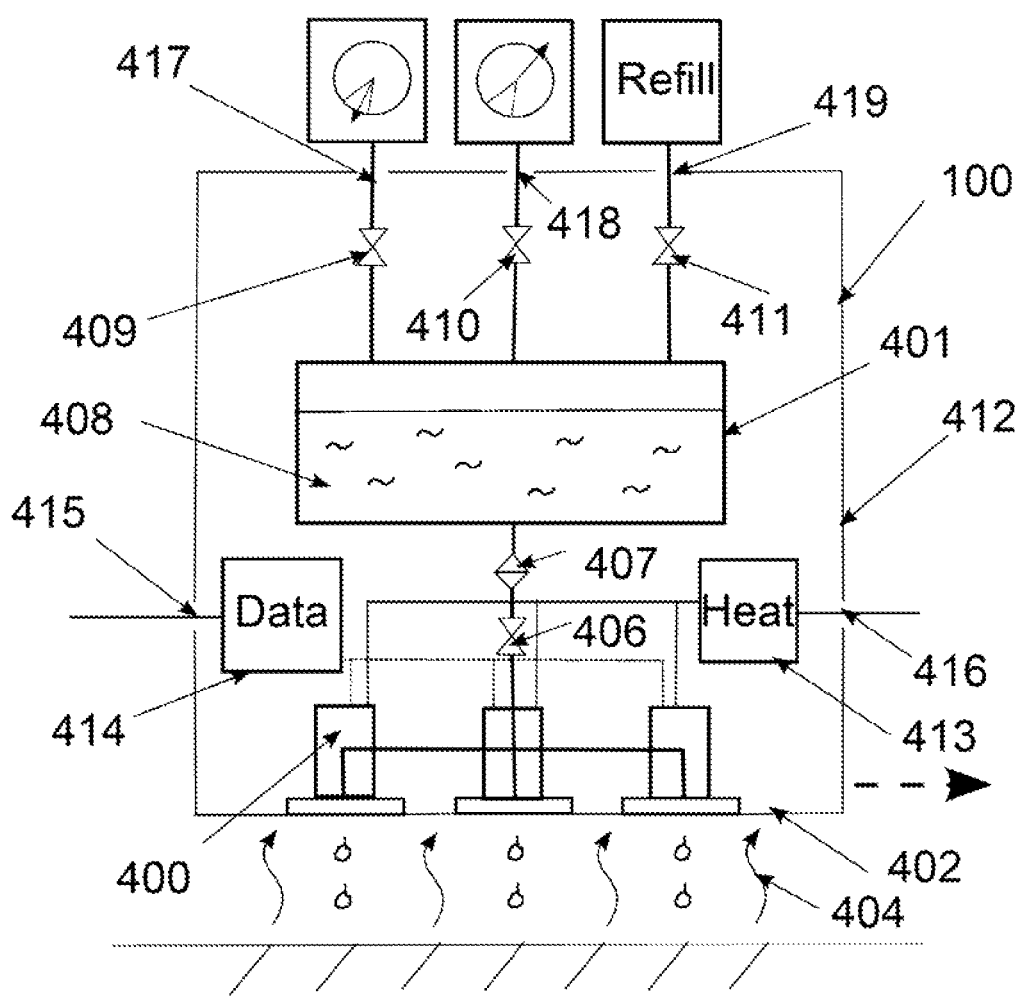
FIG. 4 shows a representation of the structure of the print head according to the prior art.

FIG. 4 shows the structure of a print head 100 according to the prior art. Various assemblies are integrated into housing 212. Print modules 400 are essential for drop generation 109. These print modules contain the nozzles, the piezoelectric drives and the fluid system for distributing the fluid. A heater is usually also integrated for temperature regulation. These modules 400 are frequently purchased from print head manufacturers such as Dimatix, Xaar, Seico, Epson, Konica or Kyocera. Intervention into the inner structure is not possible. Modules 400 are connected to a storage tank 401, which contains print fluid 408, by hoses, a valve 406 and a filter 407. Electrical connections exist to heating controller 413 and data electronics 414. The connections are run to the outside (415, 416). The storage tank is connected to underpressure, overpressure and the refill line by additional lines switched by valves (409, 410 and 411). These lines are again run to the outside (417, 418 and 419).

On the underside, the print head is protected against the penetration of fluids or contaminants by a cover plate 402. The modules and the cover plate absorb heat 404 in the form of radiation and convection during the travel over build space 111. If the temperature exceeds the setpoint of the heating controller, the temperature may no longer be held at a constant level.

Figure 5:
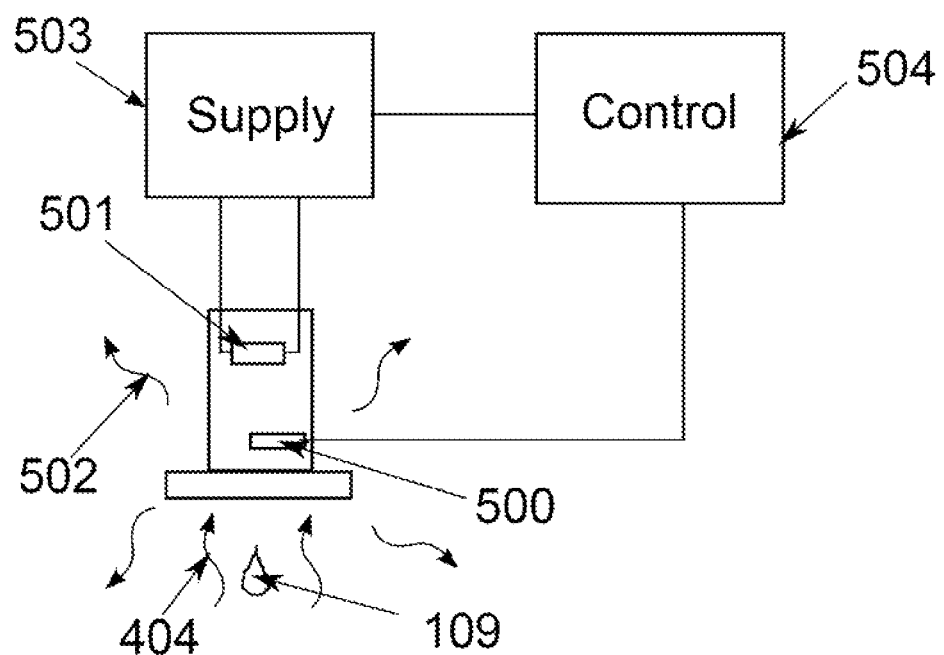
FIG. 5 shows a diagram of the control of the temperature of a print head according to the prior art.

FIG. 5 shows the heating controller of existing print heads as a block diagram. Heating system 501 itself is controlled by a power controller 503. It receives its control signals from a controller 504, which, together with a sensor 500, detects the temperature directly in module 400 and thus implements a closed control circuit. The heat losses due to heat conduction to the surrounding parts, the convection in the housing and the thermal radiation losses are identified by 502. Energy is also transferred along with heated fluid drops 109 if the temperature of the drops is higher than the temperature of the refilled fluid. All losses must be compensated for by the heating system. The temperature at the lower end of the module is relevant for drop formation.

Figure 6:
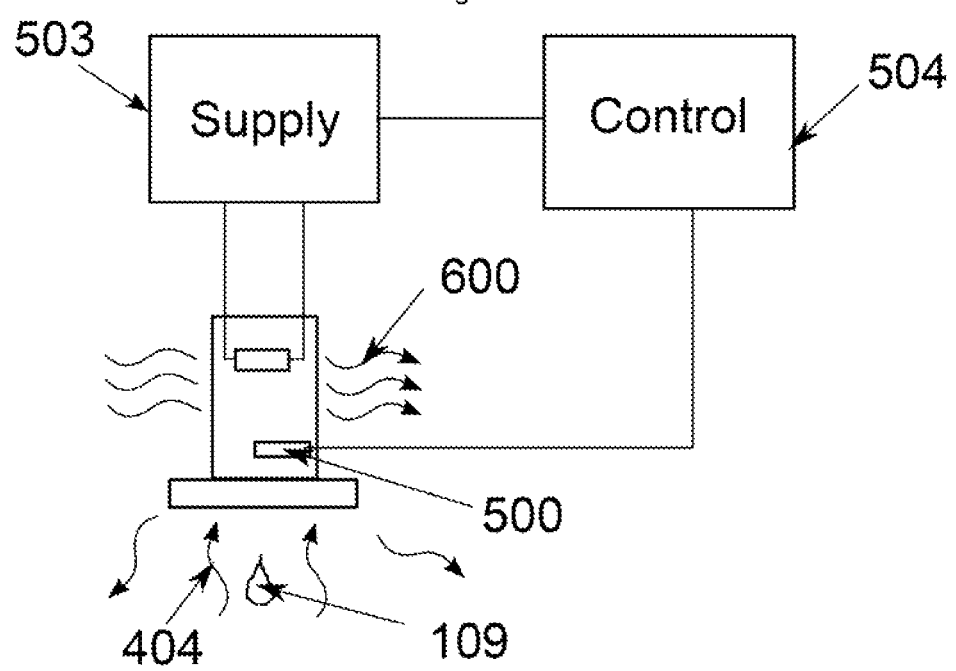
FIG. 6 shows an expanded diagram of the control of the temperature of a print head according to the prior art, including internal or external print head cooling.

FIG. 6 shows the design of a print head according to the invention. A massive heat flow 404 is added to the aforementioned variables in this case. In the HSS process described above, this heat flow is greater than the dissipated amounts of heat. The control by the print head-internal heating system may be facilitated only by introducing additional cooling 600. Cooling system 600 may include all preferred embodiments according to the invention.

Figure 7:
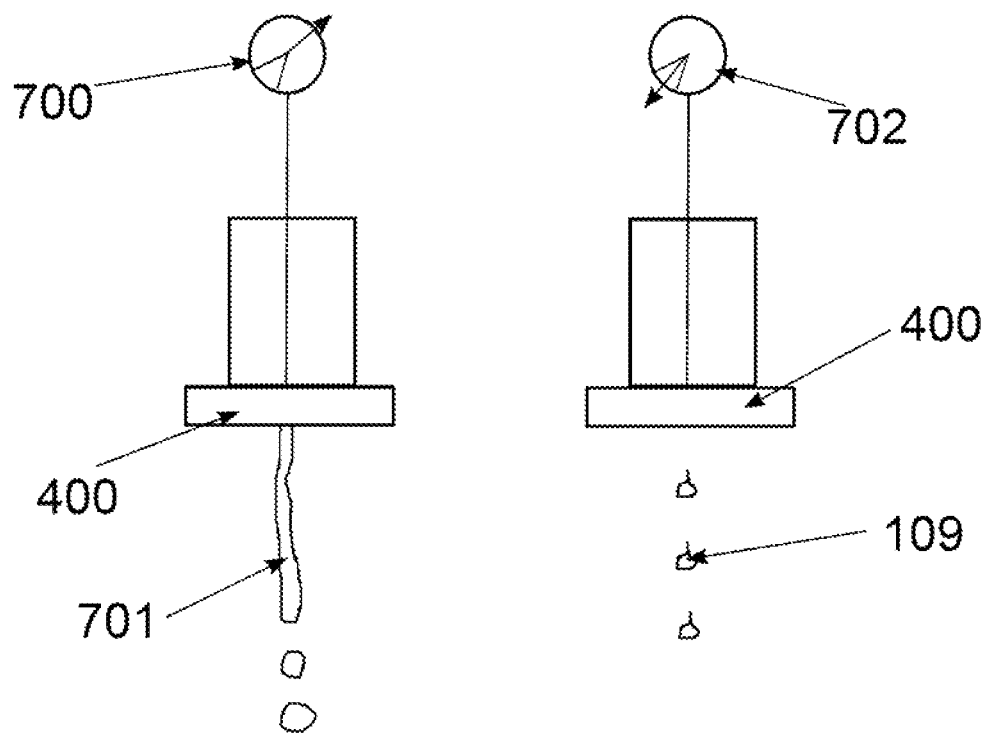
FIG. 7 shows a diagram of the cooling process by means of flushing or nozzle actuation.
Figure 8:
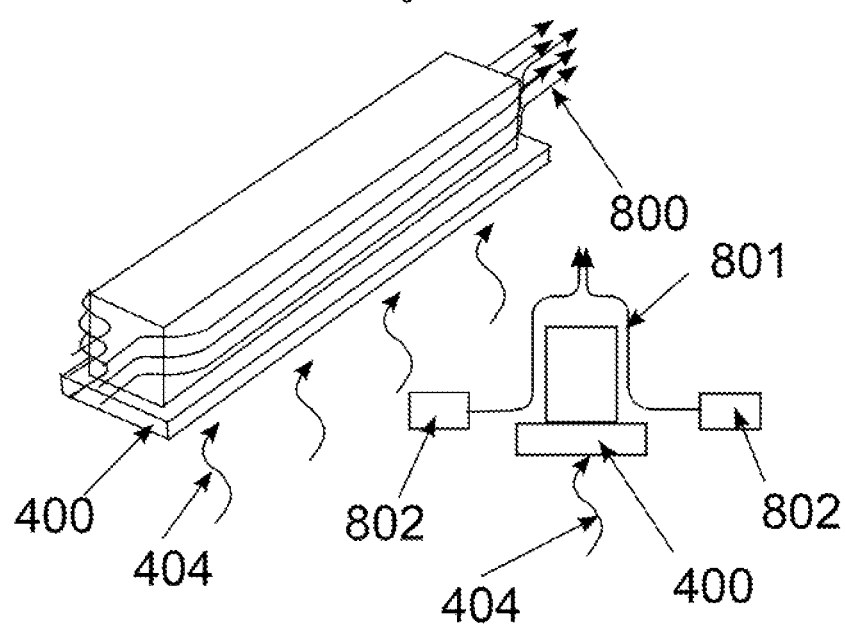
FIG. 8 shows an isometric view and a side view of a print module, with an indication of the flaw lines of the cooling air.

The form of heat dissipation illustrated in FIG. 7 is also covered by 600. In principle, two options exist. On the one hand, cold print fluid may be pressed through the print head. For this purpose, an overpressure 700 is applied to module 400 or to storage tank 401 (FIG. 4). A large amount of fluid is dispensed, and colder fluid enters module 400. In one preferred embodiment of the invention, the fluid enters print head 100 or print module 400 from a reservoir outside the build space at room temperature via insulated lines. This form of cooling may likewise take place via the drop generator of the print head. As in standard operation, an overpressure 702 is present at the tank.

The intensity of this form of cooling must be ascertained by controller 504 of print head heating system 501. If the temperature leaves the control range in the upward direction, more intensive cooling is required. This scenario may be detected by the switching times of heating system 501.

The cooling of module 400 may also be achieved via its housing. For this purpose, compressed air 800 may flow to the housing to compensate for heat absorption 404 from below. The compressed air nozzles may also be disposed in such a way that the flow rises vertically on the print module. In both embodiments of the invention, cover plate 402 (FIG. 4) must seal the modules toward the build space so that no particulate material is swirled up.

Figure 9:
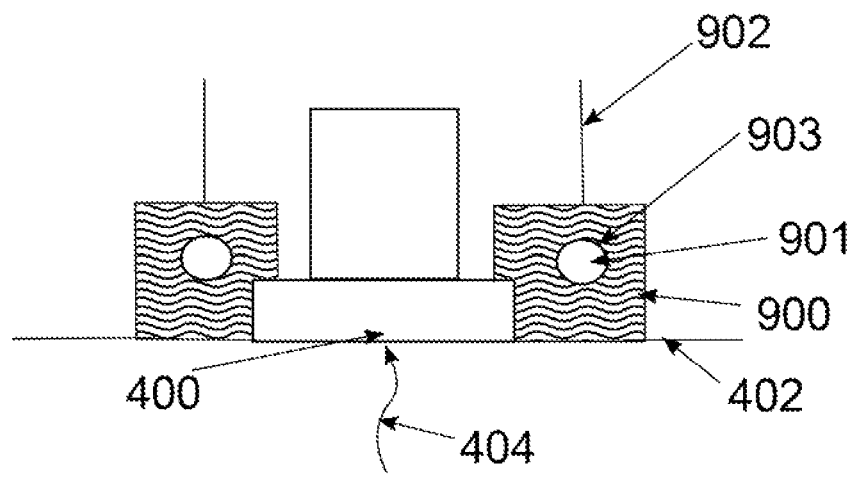
FIG. 9 shows a sectional view of the coolant channels for cooling the modules and the cover plate.

FIG. 9 shows another preferred embodiment of the invention. In this case, heat 404 to be dissipated is transferred from module 400 to a fluid by heat conduction. For this purpose, contact blocks 900 on module 400 and cover plate 402 are disposed in a way that facilitates good heat transfer. Contact blocks 900 have bores 903, in which cooling fluid 901 may flow. Connections 902 connect the contact blocks to a hose system, which passes out of the print head and the warm build space. The hose system has an insulated design. Depending on the accumulating heat, cooling fluid 901 is then cooled passively or actively.

Figure 10:
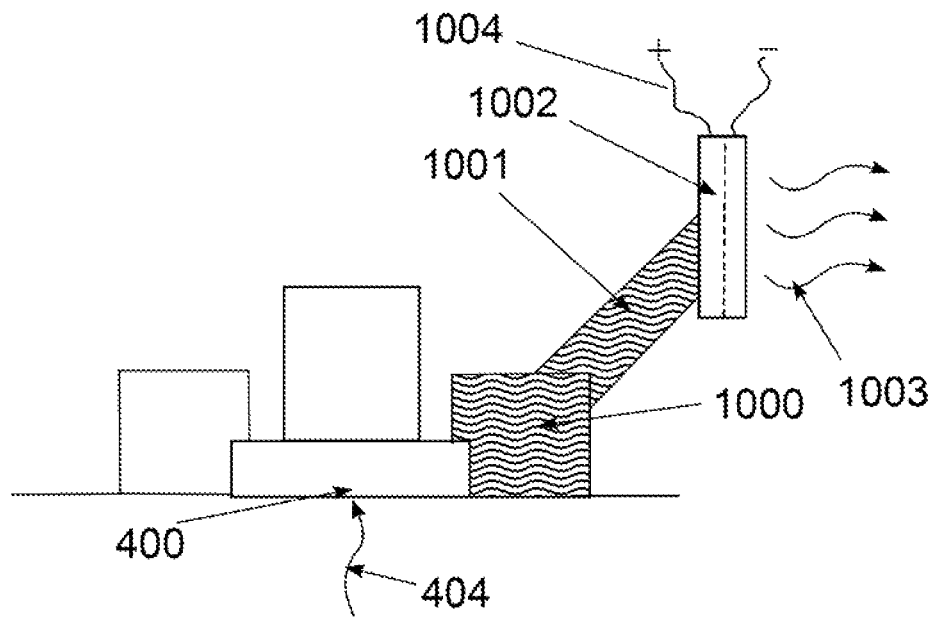
FIG. 10 shows a sectional view of the Peltier elements for actively cooling the print head with the aid of massive cooling lines.

FIG. 10 shows a likewise preferred device. In this case, excess heat 404 at module 400 is also dissipated via contact blocks 1000. In this case, the latter are in contact with Peltier elements 1002 via massive copper connections 1001. The Peltier elements pump the heat out of print head housing 412 when a voltage is applied to contacts 1004.

Figure 11:
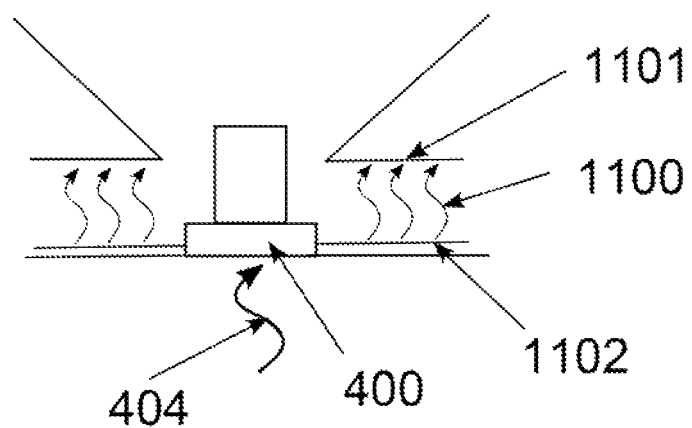
FIG. 11 shows a sectional view of a print head, including surfaces for cooling through evaporation.

The evaporation of a liquid may also be used for cooling. FIG. 11 shows an arrangement of this type. Heat 404 at module 400 is dissipated to cover plate 402 by heat conduction. A fluid 1102, which has a suitable evaporation point, is continuously redispensed thereto. The energy is taken from steam 1100 and guided out of the print head using a discharge system 1101 to avoid harmful condensation. For example, if water is selected as the fluid, temperatures around 100° C. may be controlled.

Figure 12:
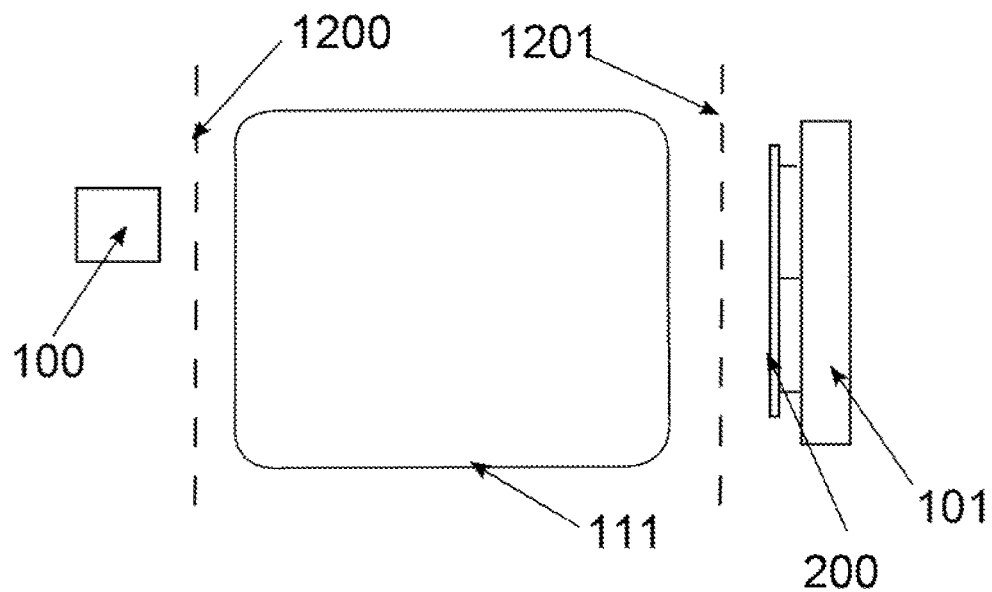
FIG. 12 shows a top view of a preferred device having partitioning in a block diagram.

FIG. 12 shows one preferred embodiment in the form of a block diagram. Print head 100 is separated from the build space by a partition 1200. In the phase of sintering, lowering and coating (FIG. 3, II, III, IV), print head 100 may thus cool without absorbing any more radiation from build space 111. The convection is also reduced. In the same manner, another partition 1201 may ensure that no additional heat reaches print head 100 due to the still warm lamp 200 during the passage of print head 105.

Figure 13:
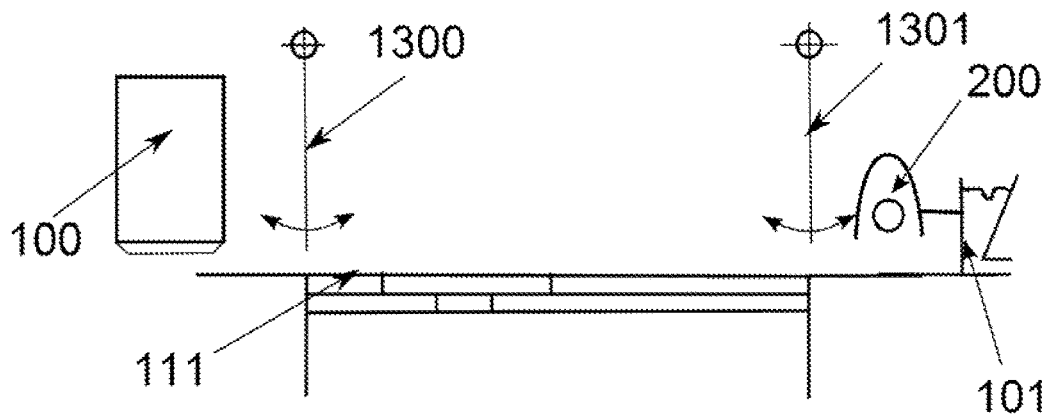
FIG. 13 shows side view one preferred embodiment, including a partition wall.

FIG. 13 shows a side view of one preferred embodiment of the invention. Partition 1300 for print head 100 is rotatably supported. Print head 100 may thus strike the partition and reach build space 111. An energy exchange takes place only when it passes through. Partition 1300 forms a chamber for the print head in which it may cool. Likewise, partition 1301 may be designed for coater 101 and lamp 200.

Figure 14:
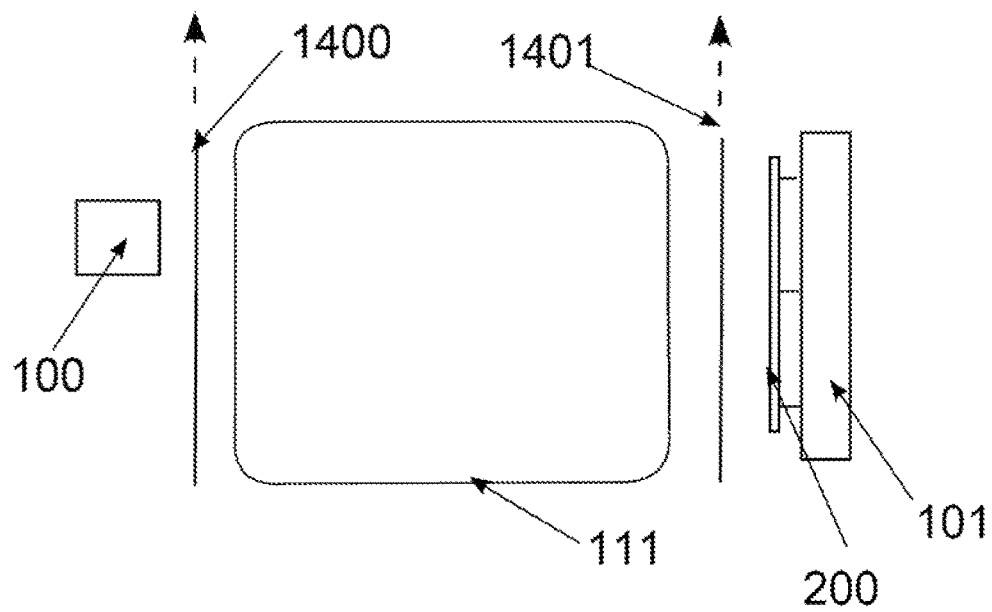
FIG. 14 shows a top view of one preferred embodiment, including different partitioning means.

The partitions illustrated in FIG. 13 may also be designed to be active, as shown in FIG. 14. Once again, one partition 1400 may be provided for print head 100, and one partition 1401 may be provided for coater 101 and lamp 200. Compared to the rotatably supported partition, this has the advantage of lesser restrictions in the movement of the units in build space 111. The opening times may also be designed to be very short. For example, pneumatic actuators or electrically driven spindles are suitable as drives.

Figure 15:
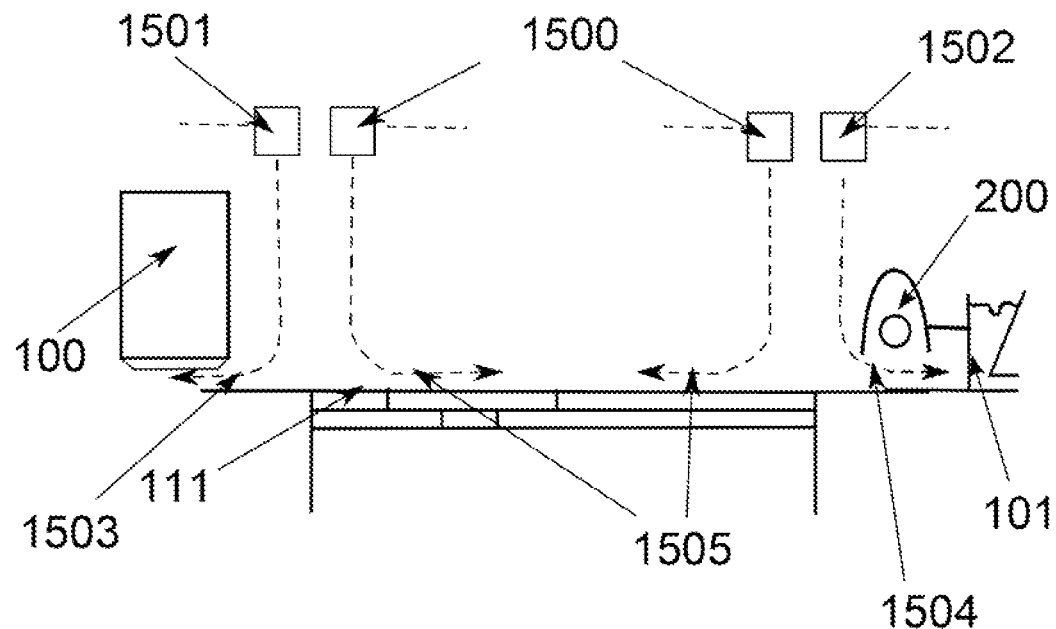
FIG. 15 shows a side view of one preferred embodiment, including an air curtain.

FIG. 15 shows one preferred embodiment of the partitioning means. Moving parts are dispensed with, Nozzles 1501, 1500, 1502 allow air having different temperatures to flow in the direction of build space 111 as a curtain. If a laminar flow is set, only a limited mixing of the air masses 1503, 1505 and 1504 takes piece. The temperature may be controlled and also regulated in segments via corresponding heating and cooling units.

Figure 16:
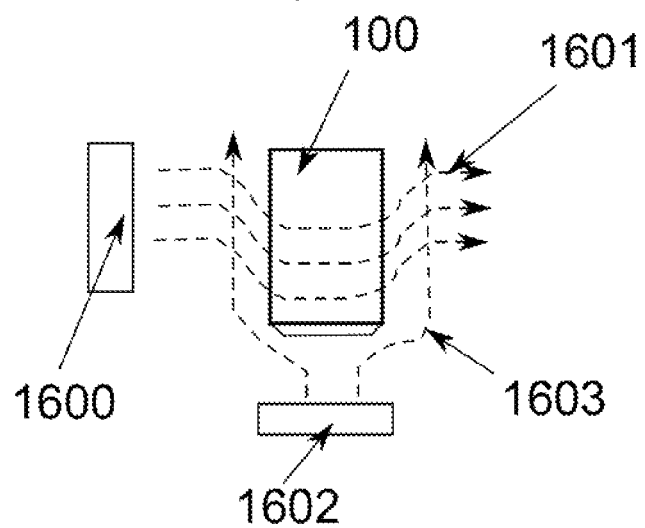
FIG. 16 shows a side view of one preferred embodiment, including a print head air cooling means.

According to the invention, it is not only possible to cool print head 100 by partitioning or from the inside, but the print head may also be cooled from the outside. FIG. 16 shows a design of this type. Print head 100 is flushed with cooling air 1601 and 1603. This air is discharged from nozzles 1600 and 1602. The flow of cooling air should not interact with the particulate material. It is therefore particularly preferred to combine the cooling with a partitioning.

Figure 17:
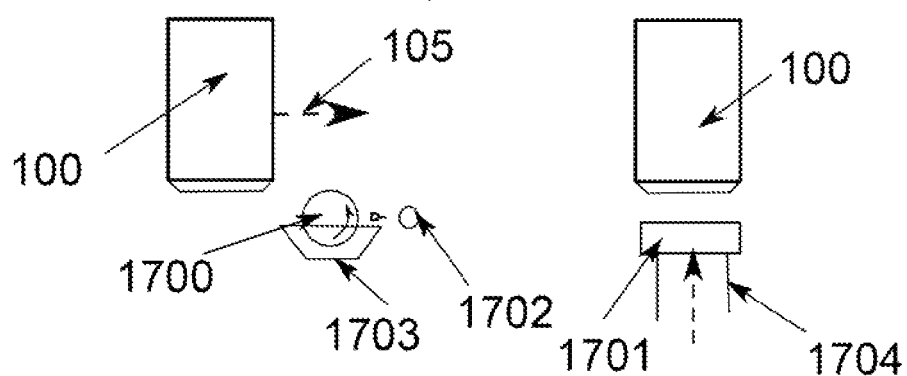
FIG. 17 shows a side view of a device for active contacting with a fluid-cooled cleaning device and a cooling block.
Figure 18:
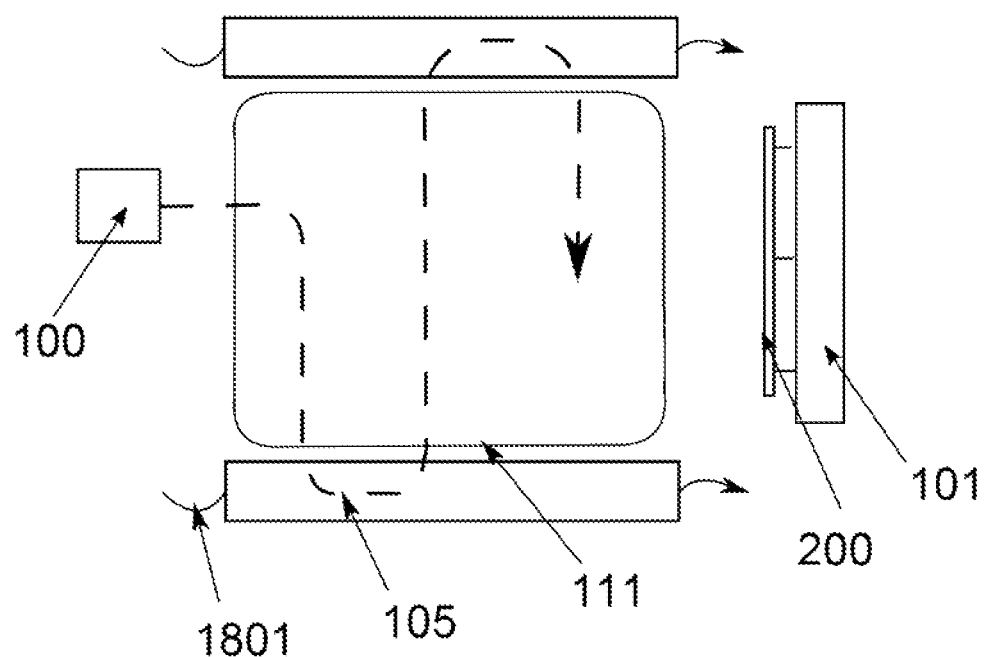
FIG. 18 shows a top view of a device according to the invention, including cooled build space edges.

FIG. 17 shows another means of cooling the print head from the outside. Print head 100 is brought directly into contact with a heat-dissipating material. This may be a fluid which absorbs the heat. This may be combined with a cleaning device for the print head. A counter-rotating roller 1700 may be brought into contact with print head 100 moving in direction 105. The roller, which has been moistened by a shower 1702 or a fluid-filled basin 1703, absorbs heat from the print head. A good thermally conductive body 1701 may also be pressed onto cover plate 102 of print head 100. This body, in turn, is passively or actively cooled, for example using a cooling fluid 1704.

Print head 100 may cool not only in its idle position but also on its path 105 on the edge of build space 111. For this purpose, build space edges 1800 must be colder than the build space. This may be achieved by the fact that edges 1800 of build space 111 are designed as pipes through which cooling air 1801 flows.

Figure 19:
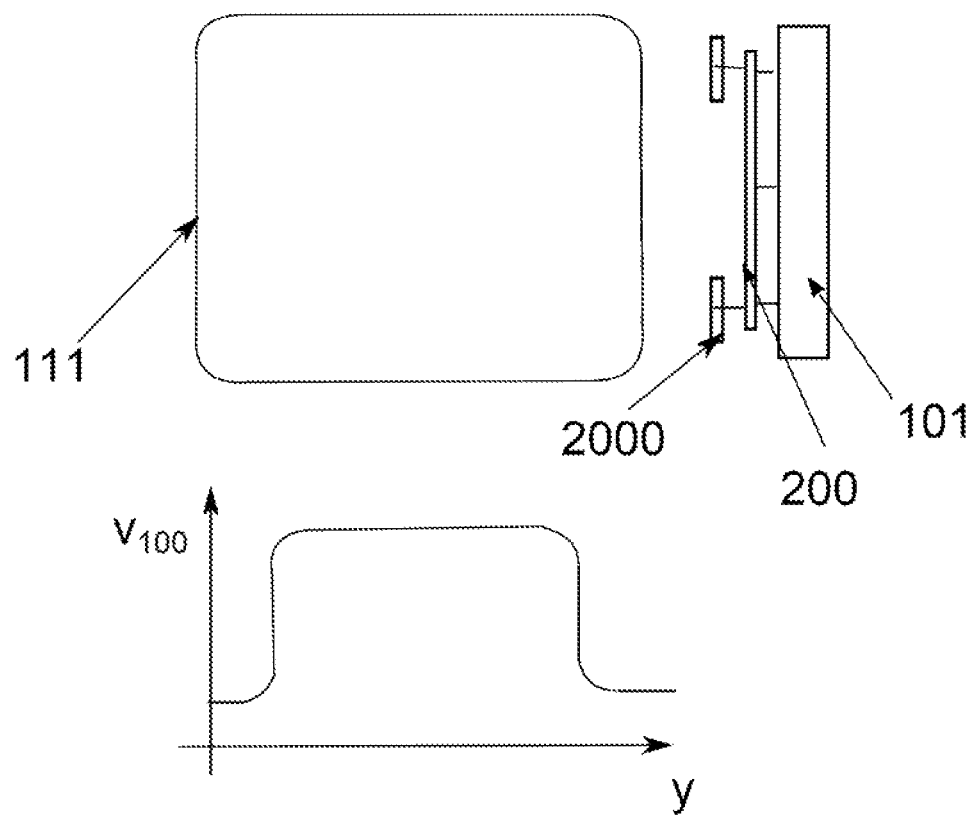
FIG. 19 shows a top view of one preferred embodiment, including a linear lamp, segmented activation and a diagram for the movement speed.

FIGS. 19 and 20 show of one particularly preferred embodiment of the invention FIG. 19 shows the design of lamp 200 in an essentially linear embodiment. A homogeneous illumination of build space 111 is achieved. Due to the control, the direct influence of the print head may be minimized. Since cooler areas may occur on the edge of the build space, despite a uniform radiation power, due to the air circulation, additional segments 2000 may be mounted here, or a lamp with segmented control of the power may be used.

FIG. 19 also shows a diagram for a particularly preferred control of the lamp movement of a linearly designed lamp. Due to the convection on build space 111, it is sensible to irradiate the edges at a slower movement speed while maintaining a constant power. It is likewise possible to adjust the power. The inertia of the lamp imposes limits on the method.

LIST OF REFERENCE NUMERALS

100 Print head
101 Coater
102 Building platform
103 Body
104 Device
105 Print head path
106 Coater path
107 Built layers
108 Direction of building platform
109 Microdrops
110 Particulate material roll
111 Build space
112 Coater gap
113 Powder stock
200 Heat lamp
400 Print module
401 Storage tank
402 Cover plate
403 Heated surface
404 Heat transfer
406 Valve
407 Filter
408 Printing fluid
409 Valve for underpressure
410 Valve for overpressure
411 Valve for refilling
412 Print head housing
413 Heating controller
414 Data electronics
415 Feed-through for data electronics
416 Feed-through for heating controller
417 Feed-through for underpressure line
418 Feed-through for overpressure line
419 Feed-through for refilling line
500 Temperature sensor
501 Heating
502 Heat dissipation
503 Power controller
504 Controller
600 Cooling
700 Overpressure
701 Overpressure jet
702 Underpressure
800 Flow, horizontal
801 Flow, vertical
802 Air nozzles
900 Contact block
901 Cooling fluid
902 Cooling line*
903 Cooling pipe
1000 Contact block
1001 Massive heat conductors
1002 Peltier element
1003 Pumped-off heat
1004 Electrical contacting
1100 Steam
1102 Fluid
1101 Steam guidance
1200 Print head partition 1201 Coater partition
1300 Rotatable print head partition
1301 Rotatable coater partition
1400 Movable print head partition
1401 Movable coater partition
1500 Air nozzles for build space flow
1501 Air nozzle for print head flow
1502 Air nozzle for coater flow
1503 Print head flow
1504 Coater flow
1505 Build space flow
1800 Build space edge
1801 Cooling air for build space edge
2000 Additional lamps

The invention claimed is:

1. A device for producing three-dimensional models by a layering technique, particulate build material being applied to a build space in a process chamber, a moderating agent subsequently being selectively applied with the aid of an ink-jet print head, and the printed areas being solidified by supplying energy that controls a temperature of the build space, characterized in that the print head is protected against overheating by active and/or passive cooling by a cooling component that independently regulates a temperature of the print head relative to the temperature of the process chamber, wherein the cooling component acts to cool the temperature of the print head lower than the temperature of the build space; wherein
the cooling takes place with the aid of the print medium to be printed; or
the cooling takes place with the aid of cooling air which is flushed around sensitive parts in the interior of the print head; or
the cooling of the print head takes place by dissipating heat with the aid of an additional fluid medium; or
the cooling takes place with the aid of Peltier elements.

2. The device according to claim 1, characterized in that the device has a temperature sensor, a temperature controller and a cooling and heating unit including the cooling component.

3. The device according to claim 1, characterized in that the print head is protected against the residual energy of the build space and the particulate material and active energy supply on the build space by partitioning.

4. The device according to claim 3, wherein the device is characterized by one or any combination of the following:
i) the print head is moved behind a flexible or fixed wall in the build space; or
ii) a collision with the wall is detected by sensors in the print head or the wall; or
iii) the partitioning takes place using a movable wall; or
iv) an air curtain partitions off the print head.

5. The device according to claim 1, characterized in that the print head is protected by an external cooling means.

6. The device according to claim 5, wherein the external cooling means includes:
actively moving cooling air to flow around the print head; or
the print head is brought into contact with a cool object or a fluid from the outside; or
the print head is passively cooled in a cooled chamber.

7. The device according to claim 1 characterized in that the condensate formation on the print head is prevented by temperature control and by controlling the humidity.

8. The device according to claim 7, wherein the device includes metal cooling plates positioned at reversing points in the build space for cooling the print head by passing the print head over the metal cooling plates.

9. The device according to claim 1, wherein an evaporator is disposed in the print head.

10. The device according to claim 1, wherein
the device has a cooling system including a temperature sensor, a temperature controller and the cooling component for cooling the print head; and
the print head is protected against the residual energy of the build space and the particulate material and active energy supply on the build space by partitioning.

11. The device of claim 1, wherein the device includes an insulated build cylinder to reduce heat loss.

12. The device of claim 1, wherein the process chamber is insulated.

13. The device of claim 1, wherein the print head is characterized by a drop size of about 20 to 200 µm.

14. The device of claim 1, wherein the print head moves at a distance of about 1-5 mm above the particulate material in the build space, and the print head is maintained at a temperature of 40 to 60° C.

15. The device of claim 1, wherein the device provides a control a temperature of the print head of +/−2° C.

16. The device of claim 1, wherein a lamp is used to supply energy which emits an essentially linearly distributed radiation and which is guided over the build space in such a way that the radiation essentially evenly covers the entire build space, wherein the build space is in an insulated process chamber.

17. The device according to claim 16, characterized in that the power of the lamp is controlled in segments and may thus also be regulated.

18. The device according to claim 17, wherein the lamp essentially emits IR radiation in the wavelength range of 1 µm to 4 µm.

19. The device according to claim 18, wherein the lamp is separated from the print head by partitioning in its idle position or the lamp is spatially located at a distance from the print head in its idle position.

20. The device of according to claim 19, wherein the partitioning is included and
the partitioning takes place with the aid of a flexible or fixed wall; or
the partitioning takes place with the aid of an air curtain; or
the partitioning takes place with the aid of a movable wall.

21. A device for producing three-dimensional models by a layering technique, particulate build material being applied to a build space in a process chamber, a moderating agent subsequently being selectively applied with the aid of an ink-jet print head, and the printed areas being solidified by supplying energy, characterized in that the print head is protected against overheating by active or passive cooling, wherein the cooling takes place with the aid of the print medium to be printed, wherein an excess of the print medium is applied from a reservoir to the print head.

* * * * *

UNITED STATES PATENT AND TRADEMARK OFFICE
CERTIFICATE OF CORRECTION

PATENT NO. : 11,097,469 B2  
APPLICATION NO. : 14/435557  
DATED : August 24, 2021  
INVENTOR(S) : Ingo Ederer and Daniel Günther Page 1 of 1

It is certified that error appears in the above-identified patent and that said Letters Patent is hereby corrected as shown below:

On the Title Page

Page 3, U.S. PATENT DOCUMENTS:

Column 1, Line 73, delete "2002/0000163 A1 2/2002 Shen" and insert --2002/0016387 A1 2/2002 Shen--
Column 2, Line 23, delete "2004/0009405 A1 5/2004 Kasperchik et al." and insert --2004/0094058 A1 5/2004 Kasperchik et al.--
Column 2, Line 32, delete "2004/0002325 A1 11/2004 Monsheimer et al."
Column 2, Line 35, delete "2005/0000173 A1 1/2005 Harrysson" and insert --2005/0017386 A1 1/2005 Harrysson--

Page 4, U.S. PATENT DOCUMENTS:

Column 1, Line 5, delete "2010/0002443 A1 9/2010 Ederer et al." and insert --2010/0244301 9/10 Ederer et al.--
Column 1, Line 20, delete "2012/0009725 A1 4/2012 Hartmann" and insert --2012/0097258 4/2012 Hartmann--
Column 1, Line 22, delete "2012/0012645 A1 5/2012 Abe et al." and insert --2012/0126457 A1 5/2012 Abe et al.--
Column 1, Line 40, delete "2014/0002023 A1 7/2014 Ederer et al." and insert --2014/0202382 A1 7/2014 Ederer--
Column 1, Line 53, delete "2015/0026623 A1 9/2015 Ederer et al." and insert --2015/0266238 A1 9/2015 Ederer et al.--
Column 1, Line 57, delete "2016/0000015 A1 1/2016 Hartmann et al." and insert --2016/0001507 1/2016 Hartman et al.--
Column 1, Line 61, delete "2016/0001073 A1 4/2016 Hartmann et al." and insert --2016/0107386 4/2016 Hartman et al.--

Signed and Sealed this  
Twenty-ninth Day of March, 2022

Drew Hirshfeld  
*Performing the Functions and Duties of the  
Under Secretary of Commerce for Intellectual Property and  
Director of the United States Patent and Trademark Office*